United States Patent [19]
Berry et al.

[11] 4,246,612
[45] Jan. 20, 1981

[54] OPTICAL RASTER SCANNING SYSTEM

[75] Inventors: Peter J. Berry; David S. Ritchie, both of Glasgow, Scotland

[73] Assignee: Barr & Stroud Limited, Glasgow, Scotland

[21] Appl. No.: 98,366

[22] Filed: Nov. 28, 1979

[30] Foreign Application Priority Data

Feb. 28, 1979 [GB] United Kingdom ........... 7907081/79

[51] Int. Cl.$^3$ ........................ H04N 3/08; G02B 77/17
[52] U.S. Cl. ..................................... 358/206; 358/208; 350/6.8; 350/285
[58] Field of Search ............... 358/199, 206, 207, 208, 358/180, 108, 87, 88; 350/285, 6.8

[56] References Cited

U.S. PATENT DOCUMENTS

| | | | |
|---|---|---|---|
| 2,163,537 | 6/1939 | Clothier et al. | 358/206 |
| 3,564,133 | 2/1971 | Hobrough et al. | 358/88 |
| 3,632,871 | 1/1972 | Watkins et al. | 358/206 |
| 3,829,192 | 8/1974 | Wheeler | 358/208 |
| 3,941,923 | 3/1976 | Wheeler | 358/206 |
| 3,959,582 | 5/1976 | Law et al. | 358/87 |
| 4,153,917 | 5/1979 | Catano et al. | 358/87 |

*Primary Examiner*—Robert L. Griffin
*Assistant Examiner*—Edward L. Coles
*Attorney, Agent, or Firm*—Mason, Fenwick & Lawrence

[57] ABSTRACT

An optical scanning system comprises a raster scan imager mounted on a support which is rotatable in azimuth, the imager being arranged to provide a line scan which is substantially coplanar with the azimuthal rotational axis and a frame scan which is orthogonal to the line scan, a sensor is provided for monitoring azimuthal rotational rate of the support and a frame scan control means is coupled to the sensor and arranged to provide that the frame scan rate at a field of view is constant and corresponds to a standard T.V. field scan rate irrespective of the azimuthal rotational rate.

6 Claims, 8 Drawing Figures

OPTICAL RASTER SCANNING SYSTEM

BACKGROUND OF THE INVENTION

This invention relates to an optical system which incorporates a raster-scan imager.

For security and other purposes there is frequently a requirement for a surveillance system which can be used to examine a wide angle field (often 360°) in a short space of time. However, if an imager having a T.V. raster scan pattern is mounted on a support and rotated rapidly in azimuth, significant rotation occurs during the time required for a complete raster frame scan so that the resulting picture is skewed, i.e. distorted. While this is acceptable for low rotation rates the amount of distortion becomes intolerable if the azimuth rotation rate is comparable with the frame scanning rate.

SUMMARY OF THE INVENTION

It is an object of the present invention to provide an improved form of optical system incorporating a raster scan imager and which is capable of wide-angle surveillance.

According to the present invention there is provided an optical system comprising a raster scan imager mounted on a support which is rotatable in azimuth, said imager being arranged to provide a line scan which is substantially coplanar with the azimuthal rotational axis and a frame scan which is orthogonal to said line scan, a sensor for monitoring azimuthal rotation rate $\omega$ of said support, and frame scan control means coupled to said sensor and arranged to provide that the frame scan rate at a field of view is constant and corresponds to a standard T.V. field scan rate irrespective of said rotation rate $\omega$.

Preferably, means are provided for elevating the pointing direction of the imager at an angle $\phi$ with respect to a plane perpendicular to the azimuthal rotational axis, and a sensor for monitoring said elevational angle $\phi$, and said frame scan control means is coupled to said sensor and is arranged to maintain the frame scan rate at said field of view constant at said standard TV field scan rate irrespective of said elevational angle $\phi$.

Preferably also, means are provided having a magnification factor m located between said imager and said field of view, and a sensor for monitoring the magnification factor m, and said frame scan control means is coupled to said sensor and is arranged to maintain the frame scan rate at said field of view constant at said standard TV field scan rate irrespective of said magnification factor m.

It will be appreciated that although thermal imaging represents a prime application the present invention is not limited to the infra-red wavebands but permits visual examination of a scene on a standard TV monitor. A standard video recorder could also be used and this is of particular use in surveillance systems since it permits examination at leisure of a scene from which it is necessary to gather information rapidly. The information presented by the system of the present invention is a series of undistorted TV fields and any overlap of successive fields depends upon azimuthal speed of rotation.

The present invention will now be described by way of example with reference to the accompanying drawings in which:

DESCRIPTION OF THE PREFERRED EMBODIMENTS

Figure 1A:
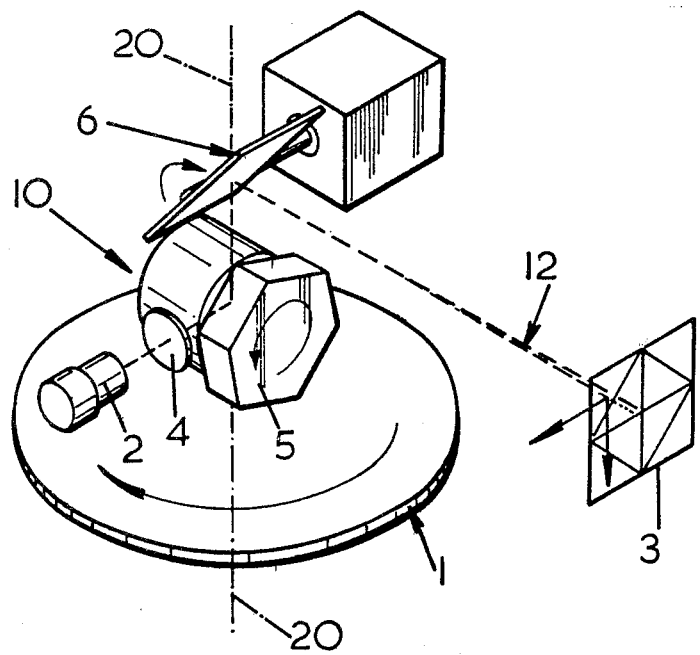
FIG. 1(a) shows an imager with a TV raster scan which produces an output which is distorted as shown in FIG. 2(a)
Figure 2A:
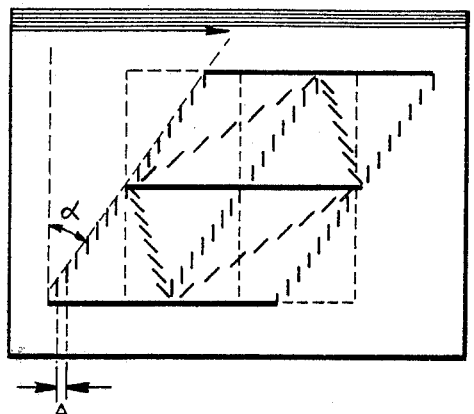

FIG. 1(a) illustrates an optical system having a raster scan imager 10 giving a horizontal line scan and vertical frame scan, mounted on a turntable 1 which is rotatable in azimuth, i.e. about axis 20. The imager 10 includes a detector 2, lens 4 and orthogonal scanners 5,6. An image of the detector 2 is formed by the lens 4 at the target 3 which constitutes a field of view and is scanned across the target by the mechanical line scanner 5 and the mechanical frame scanner 6. The detector 2 may take the form of an array of detector elements so that several lines are scanned simultaneously, line storage methods being used to present the output in a serial, TV-compatible form. When the turntable 1 is rotated, the pointing direction of the imager which is denoted by line 12 may move significantly during the time taken for the frame scan, so that the image of the target is distorted, i.e. skewed by angle $\alpha$, as shown in FIG. 2(a). The dislocation of continuous lines which occurs if the detector has several parallel elements is also shown and is denoted by $\Delta$.

Figure 1B:
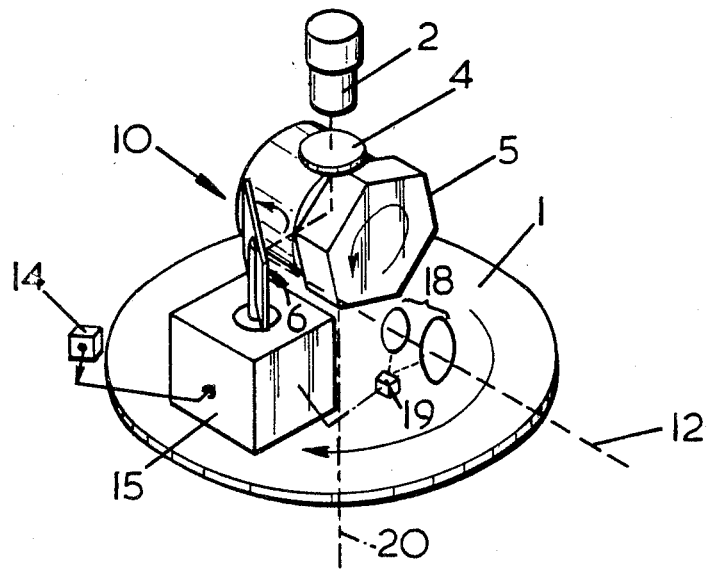
FIG. 1(b) shows a system in accordance with the present invention and the effect of azimuthal rotation on the output is as shown in FIG. 2(b) and 2(c)
Figure 2B:
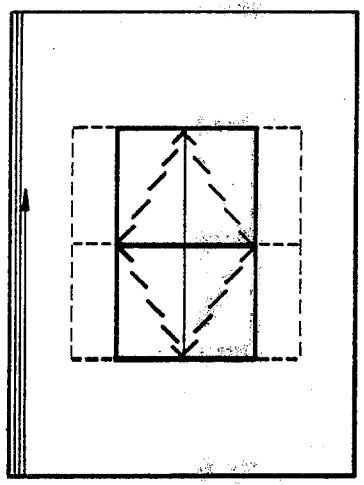
Figure 2C:
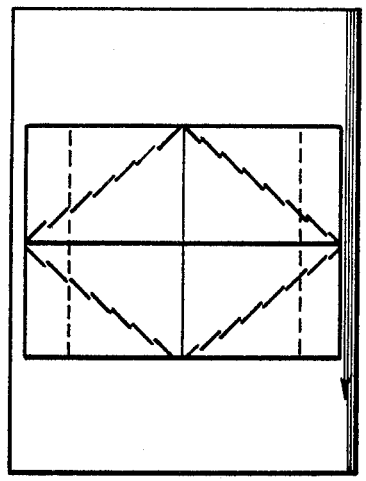

FIG. 1(b) illustrates the mechanical scanning system 10 of FIG. 1(a) arranged in accordance with the present invention so that the line scan produced by scanner 5 is vertical, i.e. coplanar with the azimuthal axis 20. When the turntable 1 is rotated, if the frame scan rate produced by scanner 6 is held constant as is the case for FIG. 1(a) the image is compressed or expanded horizontally (FIGS. 2(b) and (c)) depending on the direction of rotation of the turntable but the skew distortion is eliminated. However, in accordance with the present invention a sensor 14 is provided to monitor the rotational rate of the turntable 1 and this is coupled to the frame scan motor 15 which is thereby controlled so that the sum of the scan velocities due to the frame scanner 6 and due to the rotation of the turntable 1 is constant and corresponds to a standard TV field scan rate.

By virtue of the arrangement of the scan velocities distortions and contiguity errors are removed, i.e. the distortion $\Delta$ in FIG. 2(a) is eliminated from the target image when the pointing direction 12 extends perpendicularly to the rotational axis 20 of the turntable 1.

Let the angular velocity of the turntable 1 be $\omega$, and the angular velocity due to the frame scanner 6 be $\omega_F$. If the line of sight 12 of the imager 10 is horizontal the frame scan velocity at the field of view, namely the target 3, due to the turntable is equal to $\omega$ so that the requirement is $\omega_F + \omega = \omega_{FO}$ where $\omega_{FO}$ is the required frame scan velocity at the field of view for TV compatibility. From FIG. 3(a) it can be seen that if the line of sight 12 of the imager 10 is driven by a drive 17 to an elevation angle $\phi$ the effective scan velocity at the field of view due to the turntable rotation is $\omega \cos \phi$. (If $\phi = 90°$ there is no scan action due to the turntable rotation, and the image merely rotates about the centre of the scanned field). The previous requirement for the general case thus becomes $\omega_F + \omega \cos \phi = \omega_{FO}$.

Figure 3A:
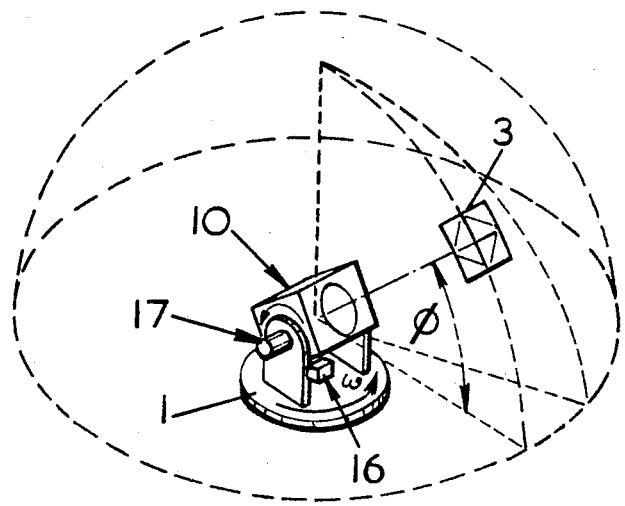
FIG. 3(a) shows the system of FIG. 1(b) with an elevation adjustment which results in an output which is distorted as shown in FIG. 3(b)

In order to implement this the system of FIG. 3(a) incorporates a sensor 16 for monitoring the magnitude of the angle $\phi$ and this sensor 16 is coupled to the frame scan motor 15.

It is frequently required that a basic imager 10 should be capable of operation with several different fields of view which are selected by changing the magnification of an auxiliary telescope 18 (FIG. 1b), or the focal length of the objective lens in a focal scanner. If the magnification of the telescope is m (or the ratio of the focal lengths is m) as denoted by sensor 19, the scan velocity due to the frame scanner 6 on its own becomes $\omega_F/m$, the value for TV compatibility being $\omega_{FO}/m$ and the previous requirement is further modified and becomes:

$$(\omega_F/m) + \omega \cos \phi = \omega_{FO}/m$$

For TV compatibility the frame rate $\omega_{FO}$ is constant so that for a constant scan efficiency the frame scan velocity is proportional to the amplitude of the frame scan drive signal. Thus, if the frame scanner is controlled by an electrical drive signal it is simply necessary to arrange that the amplitude of the drive signal is proportional to $1 - (\omega \cdot m / \omega_{FO}) \cos \phi$. This can readily be achieved by digital or analogue methods using angular pick offs to provide azimuth and elevation inputs i.e. $\omega$ and $\phi$, together with an input depending on the field of view selected by virtue of the magnification factor m.

Figure 3B:
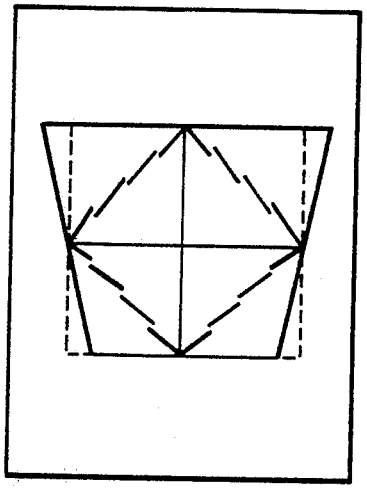

If a scanner having a wide field of view is used at a significant elevation angle $\phi$ distortion of the type shown in FIG. 3(b) occurs, even after control has been applied to the frame scan amplitude using the formula $1 - (\omega \cdot m / \omega_{FO}) \cos \phi$. The distortion is not serious, however, except for low values of m and large values of $\omega$.

Although a mechanical two-mechanism scanner has been used to illustrate the invention the procedure is equally valid if a separate scanning mechanism is inserted between the target and a single mechanism scanner. In the latter case, since the scanner normally works at a TV compatible rate without this additional mechanism, $\omega_{FO} = 0$, so $\omega_F = -m\omega \cos \phi$.

The principle is also applicable to non-mechanical scanners although detectors with frame storage, such as vidicons, are unsuitable due to image smearing unless used with a separate compensating frame scanner as described above.

Although in FIG. 3(a) the elevation angle $\phi$ is shown as being achieved by tilting the entire scanner, other means, such as an elevation mirror, could be used.

Figure 4:
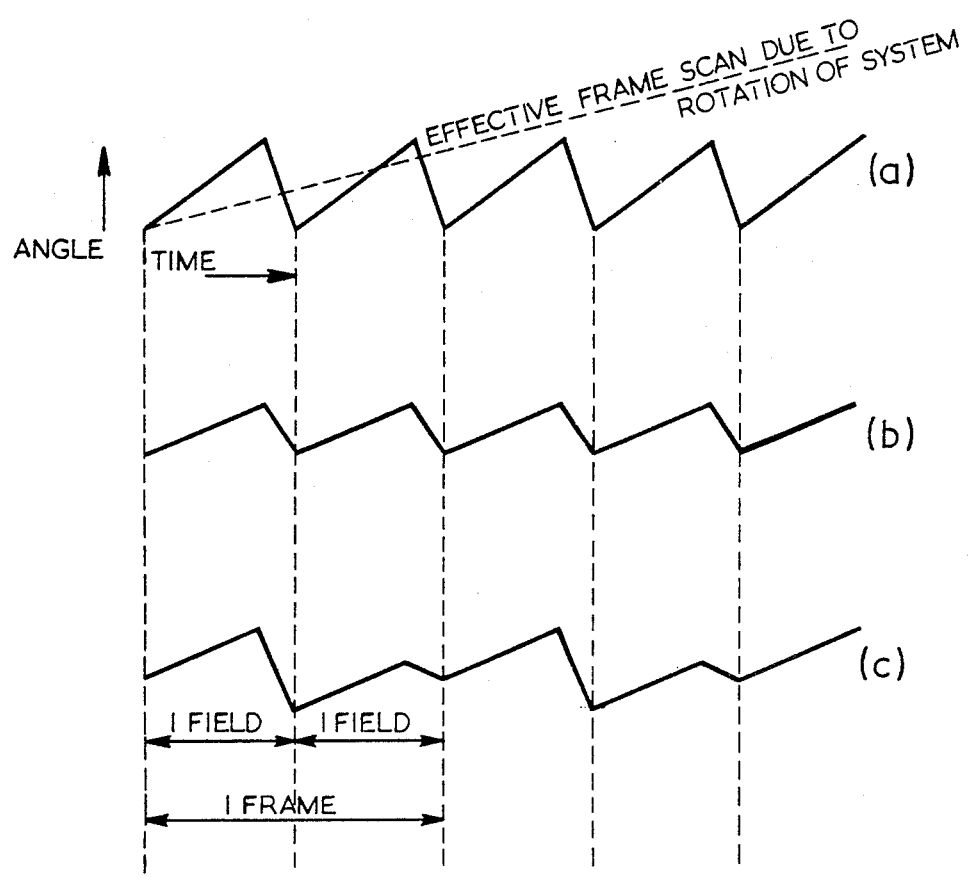
FIG. 4 shows various waveforms which are useful in understanding the present invention.

The criterion for control of the frame scanner described above gives correct scanning at the field of view at TV field rates, and in many cases this will suffice. However, in order to achieve the full resolution of TV available from 625 lines it may be necessary to superimpose two fields each of 312.5 lines, with line interlacing to give a TV frame. Since under any conditions which make the scan corrections necessary the scanner will have rotated appreciably between successive frames, the amplitude of the scanner frame flyback must be controlled if such TV frames are to be displayed or recorded successfully. This is illustrated in FIG. 4, which shows the frame scan waveforms required; (a) in the full line for a stationary system, (b) to give correction for single scanner frames for a rotation velocity $\omega$ corresponding to the broken line in (a), and (c) to give correction for pairs of scanner frames so that complete TV frames may be correctly constructed. In the latter case, the velocity of the scanning mechanism during the scan is the same as for single frame correction, but alternate flyback amplitudes are different so that the algebraic sum of the scan angle due to the frame scanner and the scan angle due to rotation of the equipment is equal to the scan angle which would be produced by the frame scanner to give TV compatibility with a stationary system.

What is claimed is:

1. An optical system comprising
a raster scan imager mounted on a support which is rotatable in azimuth, said imager being arranged to provide a line scan which is substantially coplanar with the azimuthal rotational axis and a frame scan which is orthogonal to said line scan, a sensor for monitoring azimuthal rotation rate $\omega$ of said support and frame scan control means coupled to said sensor and arranged to provide that the frame scan rate at a field of view is constant and corresponds to a standard T.V. field scan rate irrespective of said rotation rate $\omega$.

2. An optical system as claimed in claim 1, including means for elevating the pointing direction of the imager at an angle $\phi$ with respect to a plane perpendicular to the azimuthal rotational axis, and a sensor for monitoring said elevational angle $\phi$, and said frame scan control means is coupled to said sensor and is arranged to maintain the frame scan rate at said field of view constant at said standard TV field scan rate irrespective of said elevational angle $\phi$.

3. An optical system as claimed in claim 1, including means having a magnification factor m located between said imager and said field of view, and a sensor for monitoring the magnification factor m, and said frame scan control means is coupled to said sensor and is arranged to maintain the frame scan rate at said field of view constant at said standard TV field scan rate irrespective of said magnification factor m.

4. A system as claimed in claim 1, in which the imager has separate line and frame scan mechanisms.

5. A system as claimed in claim 1, in which the imager has a single scanning means providing predetermined line and frame scans, and a controllable frame scanning means is introduced and controlled in accordance with claim 1.

6. A system as claimed in claim 1, in which the scanner flyback amplitude is controlled such that pairs of successive frames can be superimposed on a TV monitor to give fully interlaced TV frames, said control being such that over a period of two frames the algebraic sum of the scan angle due to the frame scanner and the scan angle due to rotation of the equipment is equal to the scan angle which would be required to give TV compatibility with a stationary system.

* * * * *